US008515583B2

(12) United States Patent
Li

(10) Patent No.: US 8,515,583 B2
(45) Date of Patent: Aug. 20, 2013

(54) MACHINE MOTION CONTROL SYSTEM FOR TESTING ELECTRONIC COMPONENTS

(75) Inventor: Guang-chen Li, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 337 days.

(21) Appl. No.: 12/985,347

(22) Filed: Jan. 6, 2011

(65) Prior Publication Data

US 2012/0016498 A1 Jan. 19, 2012

(30) Foreign Application Priority Data

Jul. 16, 2010 (CN) .......................... 2010 1 0229002

(51) Int. Cl.
*G05B 15/00* (2006.01)
*G05B 19/18* (2006.01)
*G05B 11/01* (2006.01)
*G05B 19/23* (2006.01)
*G05B 15/02* (2006.01)
*G05B 19/19* (2006.01)
*G05B 19/40* (2006.01)

(52) U.S. Cl.
CPC ............... *G05B 15/02* (2013.01); *G05B 19/19* (2013.01); *G05B 19/40* (2013.01)
USPC ............. 700/275; 700/56; 318/560; 318/574

(58) Field of Classification Search
USPC ................. 700/56, 275; 318/560, 51, 574
See application file for complete search history.

(56) References Cited

U.S. PATENT DOCUMENTS

| | | | | | |
|---|---|---|---|---|---|
| 4,802,365 | A | * | 2/1989 | Sallberg et al. | 73/808 |
| 5,691,897 | A | * | 11/1997 | Brown et al. | 700/56 |
| 5,867,385 | A | * | 2/1999 | Brown et al. | 700/56 |
| 5,966,303 | A | * | 10/1999 | Youn | 700/56 |
| 6,018,685 | A | * | 1/2000 | Fujita et al. | 700/61 |
| 6,209,037 | B1 | * | 3/2001 | Brown et al. | 700/56 |
| 6,408,216 | B1 | * | 6/2002 | Adachi | 700/63 |
| 6,513,058 | B2 | * | 1/2003 | Brown et al. | 700/56 |
| 6,516,236 | B1 | * | 2/2003 | Brown et al. | 700/56 |
| 6,865,441 | B2 | * | 3/2005 | Chandhoke | 318/560 |
| 6,941,543 | B1 | * | 9/2005 | Brown et al. | 700/56 |
| 7,076,314 | B2 | * | 7/2006 | Saitou | 700/56 |
| 7,076,322 | B2 | * | 7/2006 | Chandhoke | 700/181 |
| 7,094,978 | B2 | * | 8/2006 | Skurnik | 178/18.01 |

(Continued)

OTHER PUBLICATIONS

Steven Engineering, Inc., "Baldor-NextMove Multi-Axis Motion Controllers", 2009, Retrieved from the Internet on Jan. 30, 2013, at "www.stevenengineering.com".*

*Primary Examiner* — Mohammad Ali
*Assistant Examiner* — Kelvin Booker
(74) *Attorney, Agent, or Firm* — Altis Law Group, Inc.

(57) ABSTRACT

A machine motion control system for testing electronic devices includes two test machines, a control card and a main controller. The test machines secure the electronic devices, whereby each test machine includes a plurality of moving parts for securing the electronic devices and a plurality of driving modules. The driving modules drive and control the corresponding moving parts of the test machine. The control card controls the driving modules. The main controller provides and transmits a movement instruction to the control card, the control card monitors and controls the driving modules according to the movement instruction, and the driving modules accordingly adjusts and drives the test machines and the moving parts on the test machines.

11 Claims, 2 Drawing Sheets

(56) References Cited

U.S. PATENT DOCUMENTS

| | | | |
|---|---|---|---|
| 7,103,424 B2* | 9/2006 | Chandhoke | 700/56 |
| 7,110,850 B2* | 9/2006 | Becker et al. | 700/174 |
| 7,194,321 B2* | 3/2007 | Sun et al. | 318/400.01 |
| 7,702,400 B2* | 4/2010 | Marchetti | 700/61 |
| 7,849,416 B2* | 12/2010 | Chandhoke et al. | 715/771 |
| 7,917,863 B2* | 3/2011 | Chandhoke et al. | 715/771 |
| 7,930,643 B2* | 4/2011 | Chandhoke et al. | 715/771 |
| 8,073,557 B2* | 12/2011 | Brown et al. | 700/56 |
| 8,302,072 B2* | 10/2012 | Chandhoke et al. | 717/109 |
| 8,334,668 B2* | 12/2012 | Wang et al. | 700/56 |
| 2002/0045956 A1* | 4/2002 | Kapitan | 700/56 |
| 2002/0126151 A1* | 9/2002 | Chandhoke et al. | 345/771 |
| 2002/0129333 A1* | 9/2002 | Chandhoke et al. | 717/107 |
| 2002/0191023 A1* | 12/2002 | Chandhoke et al. | 345/771 |
| 2003/0144751 A1* | 7/2003 | Chandhoke et al. | 700/61 |
| 2003/0193522 A1* | 10/2003 | Chandhoke | 345/764 |
| 2005/0049724 A1* | 3/2005 | Chandhoke | 700/56 |
| 2005/0055120 A1* | 3/2005 | Becker et al. | 700/108 |
| 2005/0067995 A1* | 3/2005 | Weinhofer et al. | 318/574 |
| 2006/0100723 A1* | 5/2006 | Sun et al. | 700/61 |
| 2006/0206219 A1* | 9/2006 | Brown et al. | 700/56 |
| 2006/0247801 A1* | 11/2006 | Brown et al. | 700/56 |
| 2006/0255759 A1* | 11/2006 | Takeuchi et al. | 318/574 |
| 2006/0282180 A1* | 12/2006 | Brown et al. | 700/56 |
| 2007/0096763 A1* | 5/2007 | Ehrmann et al. | 324/765 |
| 2008/0052418 A1* | 2/2008 | Marchetti | 710/7 |
| 2008/0275576 A1* | 11/2008 | Brown et al. | 700/56 |
| 2008/0275577 A1* | 11/2008 | Brown et al. | 700/56 |
| 2009/0019937 A1* | 1/2009 | Deemer et al. | 73/660 |
| 2009/0021205 A1* | 1/2009 | Cullen | 318/561 |
| 2009/0144647 A1* | 6/2009 | Chandhoke | 700/117 |
| 2009/0157199 A1* | 6/2009 | Brown et al. | 700/56 |
| 2009/0271007 A1* | 10/2009 | Brown et al. | 700/56 |
| 2009/0319459 A1* | 12/2009 | Breazeal et al. | 706/46 |
| 2010/0117639 A1* | 5/2010 | Qin et al. | 324/239 |
| 2010/0222712 A1* | 9/2010 | Peterka | 600/595 |
| 2010/0305886 A1* | 12/2010 | Zhuge | 702/56 |
| 2011/0022822 A1* | 1/2011 | Chandhoke | 712/36 |
| 2011/0288663 A1* | 11/2011 | Chandhoke | 700/61 |
| 2011/0288686 A1* | 11/2011 | Wang et al. | 700/275 |
| 2011/0295428 A1* | 12/2011 | Wang et al. | 700/275 |

* cited by examiner

MACHINE MOTION CONTROL SYSTEM FOR TESTING ELECTRONIC COMPONENTS

BACKGROUND

1. Technical Field

The disclosure generally relates to machine motion control, and more particularly relates to a machine motion control system.

2. Description of the Related Art

In the manufacturing process, notebooks, mobile phones and other electronic devices require different tests to be performed on corresponding test machines or moving parts on the test machines, such as surface pressure tests, torsion tests and pull tests, to test their mechanical strength before release. Generally, an axis control card is used to control a servo device, such as a motor, to test the electronic devices on the test machine and/or the moving part and obtain different test parameters.

However, in use, one control card can only control a corresponding test machine or a moving part to test the electronic devices thereon, which cannot meet large-scale test requirements. Moreover, the axis control cards are expensive and have complex structure, which may increase test costs.

Therefore, there is room for improvement within the art.

BRIEF DESCRIPTION OF THE DRAWINGS

Many aspects of an exemplary machine motion control system can be better understood with reference to the following drawings. The components in the drawings are not necessarily drawn to scale, the emphasis instead being placed upon clearly illustrating the principles of the exemplary machine motion control system. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
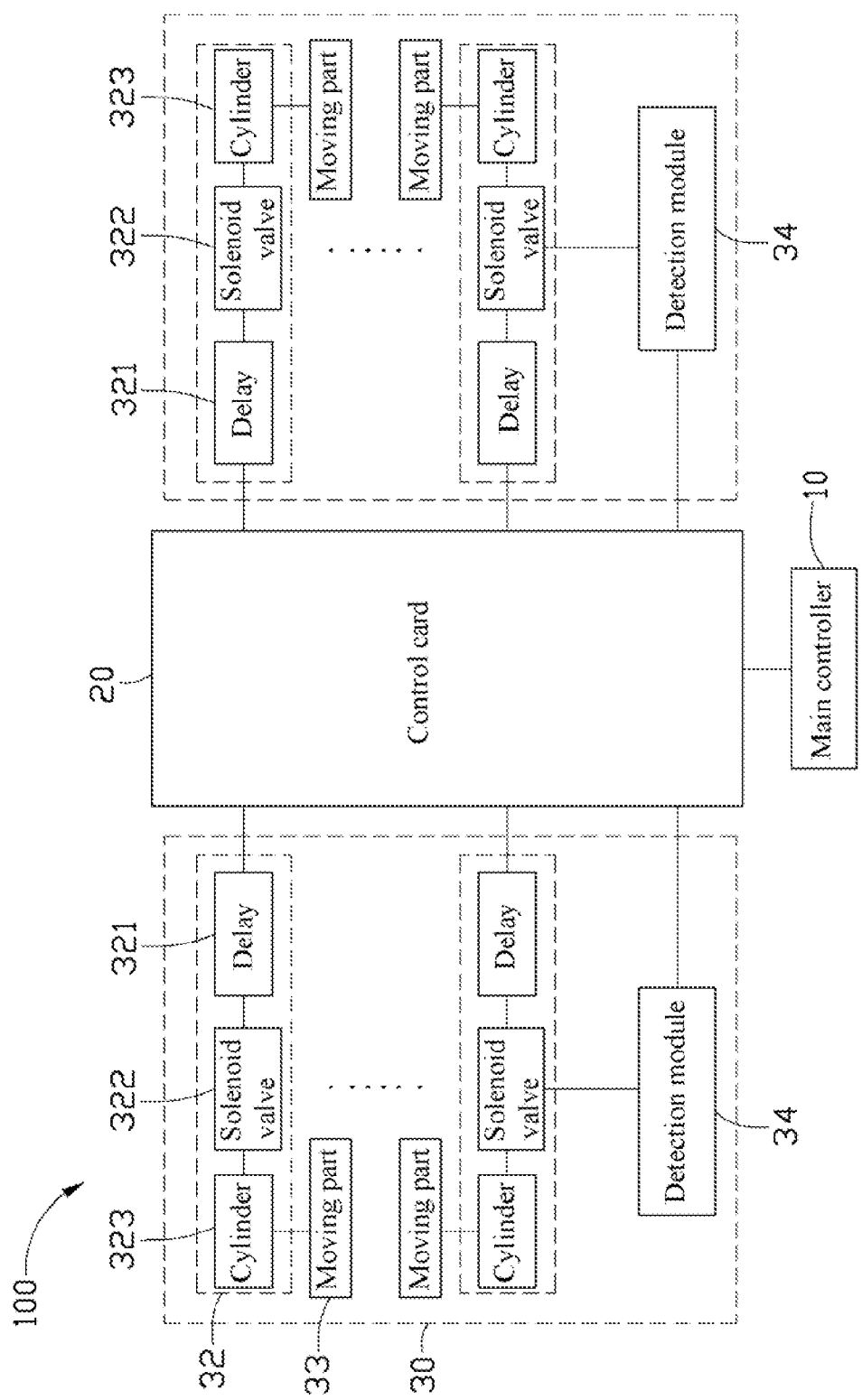
FIG. 1 is a block diagram of a machine motion control system including a main controller, a control card, and two test machines, according to an exemplary embodiment.

FIG. 1 is a block diagram of a machine motion control system 100 including a main controller 10, a control card 20, and two test machines 30, according to an exemplary embodiment. The machine motion control system 100 can be used to strength test an electronic device, such as a notebook, or a mobile phone. The main controller 10 can be a computer and is electrically connected to the control card 20. Each of the test machines 30 may a semi-automation test equipment for supporting and testing the electronic device.

Each of the test machines 30 includes a plurality of driving modules 32 for driving a plurality of moving parts 33 of the test machine 30, the moving parts 33 being capable of securing electronic devices for test. The control card 20 is electrically connected to the main controller 10 and the driving modules 32 to control the driving modules 32, as to further control movement of the moving parts 33 and the test machine 30.

Figure 2:
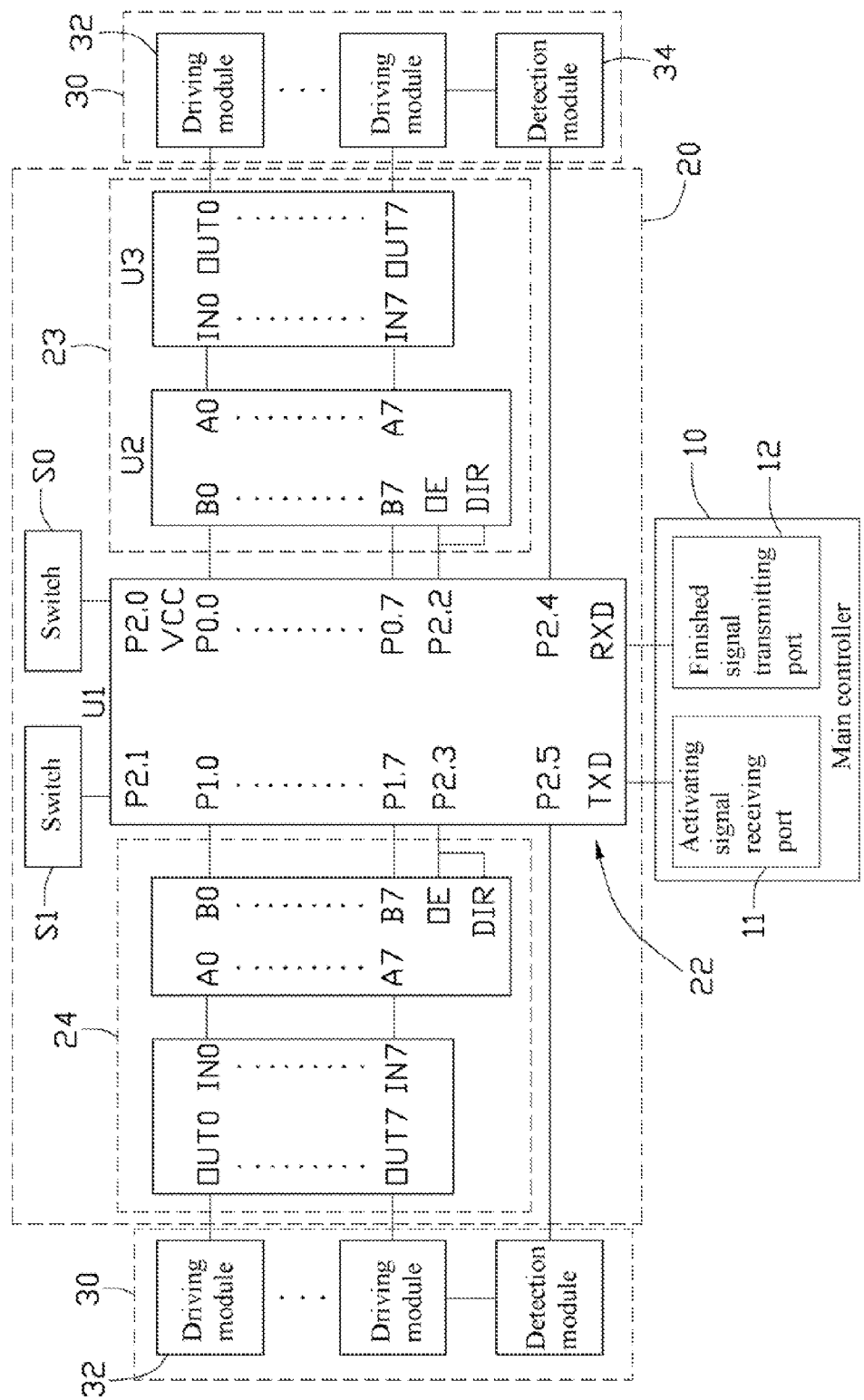
FIG. 2 is a circuit view of the main controller, the control card and the test machines of the machine motion control system of one embodiment shown in FIG. 1.

Also referring to FIG. 2, the control card 20 can be an axis control card and includes a main control module 22, two signal processing modules 23 and 24, and two switches S0 and S1. The main control module 22 includes a main microcontroller U1. The main microcontroller U1 can be an AT89S52 microcontroller and includes a power pin VCC, two groups of signal transmission pins P0.0-P0.7 and P1.0-P1.7, an activating signal transmitting pin TXD, a finished signal receiving pin RXD, two selecting pins P2.0 and P2.1, two signal control pins P2.2 and P2.3, and two signal feedback pins P2.4 and P2.5.

The power pin VCC may be electrically connected to a power source (not shown), such as a 5V battery. The selecting pin P2.0 and P2.1 are electrically connected to the two switches S0 and S1, respectively. In this exemplary embodiment, when the switch S0 or the switch S1 is operated, the voltage level of the corresponding selecting pin P2.0 or P2.1 is accordingly converted to a low voltage level (e.g., logic 0), and the main microcontroller U1 selectably switches the signal transmission paths according to the voltage level of the selecting pin P2.0 or P2.1. For example, when the switch S0 is operated, the voltage level of the corresponding selecting pin P2.0 is accordingly converted to the low voltage level, the voltage levels of the signal transmission pins P0.0-P0.7 are at the low voltage level and are enabled, and the voltage level of the signal transmission pins P1.0-P1.7 are at a high voltage level (e.g., logic 1) and are disabled. Thus, command signals and movement instructions of the main microcontroller U1 are transmitted to the signal processing module 23 from the signal transmission pins P0.0-P0.7.

The signal processing module 23 and 24 are electrically connected to the main microcontroller U1 of the main control module 22. In detail, the signal processing module 23 is electrically connected to the signal transmission pins P0.0-P0.7 of the main microcontroller U1, and the signal processing module 24 is electrically connected to the signal transmission pins P1.0-P1.7 of the main microcontroller U1. Thus, the signal processing modules 23 and 24 are capable of receiving the command signals and the movement instructions from the main control module 22, and processing the command signal and movement instructions.

In this exemplary embodiment, the signal processing module 23 is used as an example. The signal processing module 23 includes a group of pull-up resistors (not shown), a signal processing integrated circuit (IC) U2, and a signal amplifying IC U3 electrically connected to the signal processing IC U2. The pull-up resistors are electrically connected between the power pin VCC and the signal transmission pins P0.0-P0.7 to pull up the voltage and obtain expected logic levels of the signal transmission pins P0.0-P0.7.

The signal processing IC U2 can be a SN74LS245N IC and includes a group of data input pins B0-B7, a group of data output pins A0-A7, and two enabled pins OE and DIR. The data input pins B0-B7 are electrically connected to the signal transmission pins P0.0-P0.7, respectively, of the main microcontroller U1. For example, the data input pin B0 is electrically connected to the signal transmission pin P0.0, the data input pin B1 is electrically connected to the signal transmission pin P0.1, the data input pin B6 is electrically connected to the signal transmission pin P0.6. The enabled pins OE and DIR are low level effective pins and are electrically connected to the signal control pin P2.2. Thus, when the signal control pin P2.2 outputs a low voltage signal to the enabled pins OE and DIR, the signal processing IC U2 is enabled. The command signals and the movement instructions from the main microcontroller U1 are transmitted to the signal processing IC U2 through the data input pins B0-B7, and are output to the signal amplifying IC U3 through the data output pins A0-A7 after signal processing. When the signal control pin P2.2 outputs a voltage signal having a high voltage level to the enabled pins OE and DIR, the signal processing IC U2 is disabled to receive and transmit the command signals and the movement instructions.

The signal amplifying IC U3 can be an ULN2803A IC and includes a group of signal amplifying input pins IN0-IN7 and a group of signal amplifying output pins OUT0-OUT7. The signal amplifying input pins IN0-IN7 are electrically connected to the data output pins A0-A7, respectively, and the signal amplifying output pins OUT0-OUT7 are electrically connected to the corresponding driving modules 32, respectively. The signal amplifying IC U3 is capable of amplifying the command signals and the movement instructions from the main microcontroller U1, and transmitting the amplified signals to the driving modules 32 through the signal amplifying output pins OUT0-OUT7.

Each driving module 32 includes a delay 321, a solenoid valve 322, and a cylinder 323 electrically connected to a moving part 33. The delay 321, the solenoid valve 322 and the cylinder 323 are electrically connected in series. The delays 321 are electrically connected to the signal amplifying output pins OUT0-OUT7, respectively, of the signal amplifying IC U3 to delay the amplified signal therefrom. The solenoid valve 322 is used as a switch and is controlled by an electric current through its solenoid coil. The solenoid valve 322 receives the signals from the delay 321 to control the movement of the cylinder 323. The cylinder 323 is capable of driving the moving parts 33 on the test machine 30 for the strength testing of the electronic device.

Each test machine 30 further includes a detection module 34. The detection modules 34 are electrically connected to the solenoid valve 322 of the last driving modules 32 which are electrically connected to the signal amplifying output pins OUT7 of the signal amplifying IC U3. The two detection modules 34 are electrically connected to the signal feedback pins P2.4 and P2.5, respectively, of the main microcontroller U1 to determine whether the solenoid valves 322 of the last driving modules 32 have received the command signals or not, and transmit corresponding results to the main control module 22.

The main controller 10 includes an activating signal receiving port 11 and a finished signal transmitting port 12. The activating signal receiving port 11 is electrically connected to the activating signal transmitting pin TXD, receiving an activating signal. The finished signal transmitting port 12 is electrically connected to the finished signal receiving pin RXD to transmit a finished signal.

Further referring to FIGS. 1 and 2, the switch S0 is used as an example to illustrate operation of the machine motion control system 100. The switch S0 is operated, the voltage level of the selecting pin P2.0 is at a low voltage level, the voltage levels of the signal transmission pins P0.0-P0.7 are at the low voltage level and are enabled, and the voltage level of the signal transmission pins P1.0-P1.7 are at the high voltage level and are disabled. When the signal control pin P2.2 outputs at the low voltage level voltage to the enabled pins OE and DIR, the signal processing IC U2 is enabled. The command signal from the main microcontroller U1 is transmitted to the signal processing IC U2 through the data input pins B0-B7, and is output to the signal amplifying IC U3 through the data output pins A0-A7 after signal processing. The command signal is amplified by the signal amplifying IC U3 and is then transmitted to the driving modules 32.

The detection module 34 determines whether the solenoid valve 322 of the driving module 32 electrically connected to the signal amplifying output pins OUT7 has received the command signal from the signal amplifying IC U3. If the solenoid valve 322 receives the command signal, the detection module 34 generates and transmits a corresponding detecting result to the main control module 22, and the main microcontroller U1 sends an activating signal to the main controller 10 through the activating signal transmitting pin TXD. The main controller 10 then starts its application programs to generate a movement instruction including speed, frequency, time and other parameters. The movement instruction is transmitted to the solenoid valve 322 through the main microcontroller U1 and the signal processing module 23, so the solenoid valve 322 controls the movement of the cylinder 323 according to the movement instruction, enabling the moving parts 33 for the strength testing of the electronic device.

When the strength testing is completed, the main controller 10 sends a finished signal to the main control module 22 through the finished signal transmitting circuit 12, the voltage levels of the signal transmission pins P0.0-P0.7 are converted to the low voltage level and are disabled. Thus, the signal processing module 23 stops working. Similarly, when the switch S1 is operated, the corresponding solenoid valve 322 controls the cylinder 323 according to the movement instruction to drive the corresponding moving parts 33 for the strength testing of the electronic device. Thus, the two test machines 30 can alternately work under the control of the movement instructions.

In addition, the signal amplifying ICs U3 can be omitted, so the signal processing ICs U2 are electrically connected to the driving modules 32.

In summary, in the machine motion control system 100 of the exemplary embodiment, the control card 20 can control the movements of the two test machines 30 and the moving parts 33 on the test machines 30 in real time, and any test machine 30 ca be operated and controlled independently, so motion control system 100 can meet the test requirements. Moreover, the machine motion control system 100 has a simple circuit structure and reduces the test costs.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A machine motion control system for testing electronic devices, comprising:
   two test machines, each test machine comprising a plurality of moving parts for securing the electronic devices, and a plurality of driving modules electrically connected to the moving parts, respectively, the driving modules driving and controlling the corresponding moving parts, each driving module comprising a delay, a solenoid valve and a cylinder electrically connected to a moving part;
   a control card electrically connected to the driving modules of each of the two test machines, the control card controlling the driving modules; and
   a main controller electrically connected to the control card, wherein the main controller provides and transmits a movement instruction to the control card, the control card monitors and controls the driving modules according to the movement instruction, and the driving modules accordingly adjusts and drives the moving parts on the test machines;

wherein the control card comprises a main control module, two signal processing modules, and two switches, the main control module is electrically connected to the main controller, the two switches and the signal processing modules, each of the two test machines are electrically connected to the signal processing modules, respectively, the main control module comprises a main microcontroller, the main microcontroller comprises an activating signal transmitting pin and a finished signal receiving pin, the main controller comprises an activating signal receiving port and a finished signal transmitting port, the activating signal receiving port is electrically connected to the activating signal transmitting pin to receiving an activating signal, the finished signal transmitting port is electrically connected to the finished signal receiving pin to transmit a finished signal, each of the signal processing module comprises a signal processing integrated circuit and a signal amplifying integrated circuit, the signal processing integrated circuit comprises a group of data input pins and a group of data output pins, the data input pins are electrically connected to one group of signal transmission pins, respectively, of the main microcontroller, the data output pins are electrically connected to the signal amplifying integrated circuit, the signal amplifying integrated circuit amplifies command signals and movement instructions from the main microcontroller, the signal amplifying integrated circuit comprises a group of signal amplifying input pins and a group of signal amplifying output pins, the signal amplifying input pins are electrically connected to the data output pins, respectively, the signal amplifying output pins are electrically connected to the corresponding driving modules, respectively, the delay of each driving module is electrically connected to the signal amplifying output pins, respectively, of the signal amplifying integrated circuit to delay the amplified signals, the solenoid valves receive the delayed signals from the delays to control the movement of the cylinders, and the cylinders drives the moving parts on the test machine.

2. The machine motion control system as claimed in claim 1, wherein when one of the two switches is operated, the corresponding signal processing module and the test machine are enabled and form a corresponding signal transmission path, the main controller transmits the command signals or movement instructions to the signal processing module and the test machine to control and drive the moving parts of the test machine.

3. The machine motion control system as claimed in claim 1, wherein the main microcontroller further comprises two groups of signal transmission pins and two selecting pins, the selecting pins are electrically connected to the two switches, respectively, the two groups of signal transmission pins are electrically connected to the signal processing modules, when one of the two switches is operated, the voltage level of a corresponding selecting pin is converted to a low voltage level, the corresponding group of signal transmission pins are enabled, and the command signals or the movement instructions are transmitted to the signal processing module though the group of signal transmission pins.

4. The machine motion control system as claimed in claim 1, wherein the signal processing integrated circuit further comprises two enabled pins, the main microcontroller further comprises two signal control pins, and the enabled pins are electrically connected to the signal control pins, respectively and are controlled by the voltage level of the signal control pins.

5. The machine motion control system as claimed in claim 4, wherein when the signal control pins output low voltage signals to the enabled pins, the signal processing integrated circuits are enabled, and the command signals and the movement instructions from the main microcontroller are transmitted to the signal processing integrated circuits through the data input pins and are output to the signal amplifying integrated circuit through the data output pins.

6. The machine motion control system as claimed in claim 1, wherein the main microcontroller further comprises two signal feedback pins, the test machine further comprises a detection module, the detection module is electrically connected to one solenoid valve and the signal feedback pins, and the detection module is capable of generating a detecting result and transmitting the detecting result to the main control module.

7. A machine motion control system for testing electronic devices, comprising:
a plurality of moving parts for securing the electronic devices;
two test machines for supporting the moving parts, each test machine comprising a plurality of driving modules electrically connected to the moving parts, respectively, and a detection module electrically connected to one of the driving modules, the driving modules driving and controlling movements of the corresponding moving parts of the test machine, each driving module comprising a delay, a solenoid valve and a cylinder electrically connected to a moving part, the detection module providing a detecting result;
an axis control card electrically connected to the driving modules and the detection module of each of the two test machines, the axis control card generating and providing a command signal according to the detecting result; and
a main controller electrically connected to the axis control card, the main controller providing a movement instruction according to the command signal, the axis control card receiving the movement instruction from the main controller and then controlling the driving modules according to the movement instruction, the driving modules alternately driving and adjusting the test machines and the moving parts of the test machines to test the electronic devices;
wherein the axis control card comprises a main control module, two signal processing modules, and two switches, the main control module is electrically connected to the main controller, the switches and the signal processing modules, the test machines are electrically connected to the signal processing modules, respectively, the main control module comprises a main microcontroller, the main microcontroller comprises two groups of signal transmission pins, two signal control pins, an activating signal transmitting pin and a finished signal receiving pin, and comprises an activating signal receiving port and a finished signal transmitting port, the activating signal receiving port is electrically connected to the activating signal transmitting pin to receiving an activating signal, the finished signal transmitting port is electrically connected to the finished signal receiving pin to transmit a finished signal, each signal processing module comprises a signal processing integrated circuit, the signal processing integrated circuit comprises two enabled pins, a group of data input pins and a group of data output pins, the data input pins are electrically connected to one group of signal transmission pins, respectively, the enabled pins are electrically connected to the signal control pins, respectively, and are controlled by the voltage level of the signal control pins, command signals and movement instructions from the main microcontroller are transmitted to the signal processing integrated circuits through the data input pins and are output to the driving modules through the data output pins when the signal control pins output low voltage signals to the enabled pins, the delay of each driving module is electrically connected to the data output pins, respectively, of the signal processing modules, the solenoid valves receive signals from the delays to control the movement of the cylinders, and the cylinders are capable of driving the moving parts on the test machine.

8. The machine motion control system as claimed in claim 7, wherein when one of the two switches is operated, the corresponding signal processing module and the test machine are enabled and form a corresponding signal transmission path, the main controller transmits the command signals or movement instructions from the main microcontroller to the signal processing module and the test machine to control and drive the moving parts of the test machine.

9. The machine motion control system as claimed in claim 7, wherein the main microcontroller further comprises two selecting pins, the selecting pins are electrically connected to the two switches, respectively, the two groups of signal transmission pins are electrically connected to the signal processing modules, when one of the two switches is operated, the voltage level of the corresponding selecting pin is converted to a low voltage level, the corresponding group of signal transmission pins are enabled, and the command signals or the movement instructions are transmitted to the signal processing module though the group of signal transmission pins.

10. The machine motion control system as claimed in claim 7, wherein the main microcontroller further comprises two signal feedback pins, the test machine further comprises a detection module, the detection module is electrically connected to one solenoid valve and the signal feedback pins, the detection module is capable of generating a detecting result and transmitting the detecting result to the main control module.

11. A machine motion control system for testing electronic devices, comprising:

two test machines, each test machine comprising a plurality of moving parts for securing the electronic devices, and a plurality of driving modules electrically connected to the moving parts, respectively, the driving modules driving and controlling the corresponding moving parts, each driving module comprises a delay, a solenoid valve and a cylinder electrically connected to a moving part;

a control card electrically connected to the driving modules of each of the two test machines, the control card controlling the driving modules; and a main controller electrically connected to the control card, wherein the main controller provides and transmits a movement instruction to the control card, the control card monitors and controls the driving modules according to the movement instruction, and the driving modules accordingly adjusts and drives the moving parts on the test machines;

wherein the control card comprises a main control module, two signal processing modules, and two switches, each of the signal processing module comprises a signal processing integrated circuit and a signal amplifying integrated circuit, the signal amplifying integrated circuit amplifies command signals and the movement instructions from the main control module, the delay of each driving module is electrically connected to the signal amplifying integrated circuit to delay the amplified signals of the signal amplifying integrated circuit, the solenoid valves receive the delayed signals from the delays to control the movement of the cylinders, and the cylinders drives the moving parts on the test machine.

\* \* \* \* \*